United States Patent [19]

Augustin et al.

[11] 4,196,259
[45] Apr. 1, 1980

[54] COATING MATERIALS

[75] Inventors: Friedrich Augustin, Frechen; Lothar Bartling, Bergheim-Glessen, both of Fed. Rep. of Germany

[73] Assignee: BASF Farben & Fasern, Münster, Fed. Rep. of Germany

[21] Appl. No.: 960,024

[22] Filed: Nov. 13, 1978

[30] Foreign Application Priority Data

Nov. 14, 1977 [DE] Fed. Rep. of Germany ....... 2750903

[51] Int. Cl.² .................. B05D 3/02; B32B 25/04; B32B 25/12; B32B 27/00
[52] U.S. Cl. ......................... 428/492; 260/2.3; 260/42.52; 427/385.5; 427/393.6; 428/500
[58] Field of Search .................. 260/2.3, 42.52; 427/385 R, 385 C; 428/492, 500

[56] References Cited

U.S. PATENT DOCUMENTS

| | | | |
|---|---|---|---|
| 3,489,710 | 1/1970 | Bonotto et al. | 260/2.3 X |
| 4,125,578 | 11/1978 | Sear | 260/2.3 X |

OTHER PUBLICATIONS

*Utilization of Synthetic & Natural Rubber Waste*, Gr. Brit. Ministry of Supply, Advisory Service on Rubber.

*Primary Examiner*—Michael R. Lusignan
*Attorney, Agent, or Firm*—Gilbert L. Wells

[57] ABSTRACT

Elastomeric coatings capable of reverting to their initial dimensions for the permanent bridging of joints and cracks in facades, walls and ceilings of old and new constructions, industrial floors, constructions at sub-grade level, using coating materials which are deposited and dried employing coating apparatus known per se by painting, plastering, caulking or spraying or rolling. The coating materials are prepared from aqueous emulsions and/or aqueous dispersions and/or solutions of film forming binders in organic solvents possibly containing water, possibly also containing pigments, extenders, fillers, softeners, admixtures and additives and furthermore contain a fine-particle, elastomeric powder dispersed through the coating materials which dry into elastomeric films.

9 Claims, 1 Drawing Figure

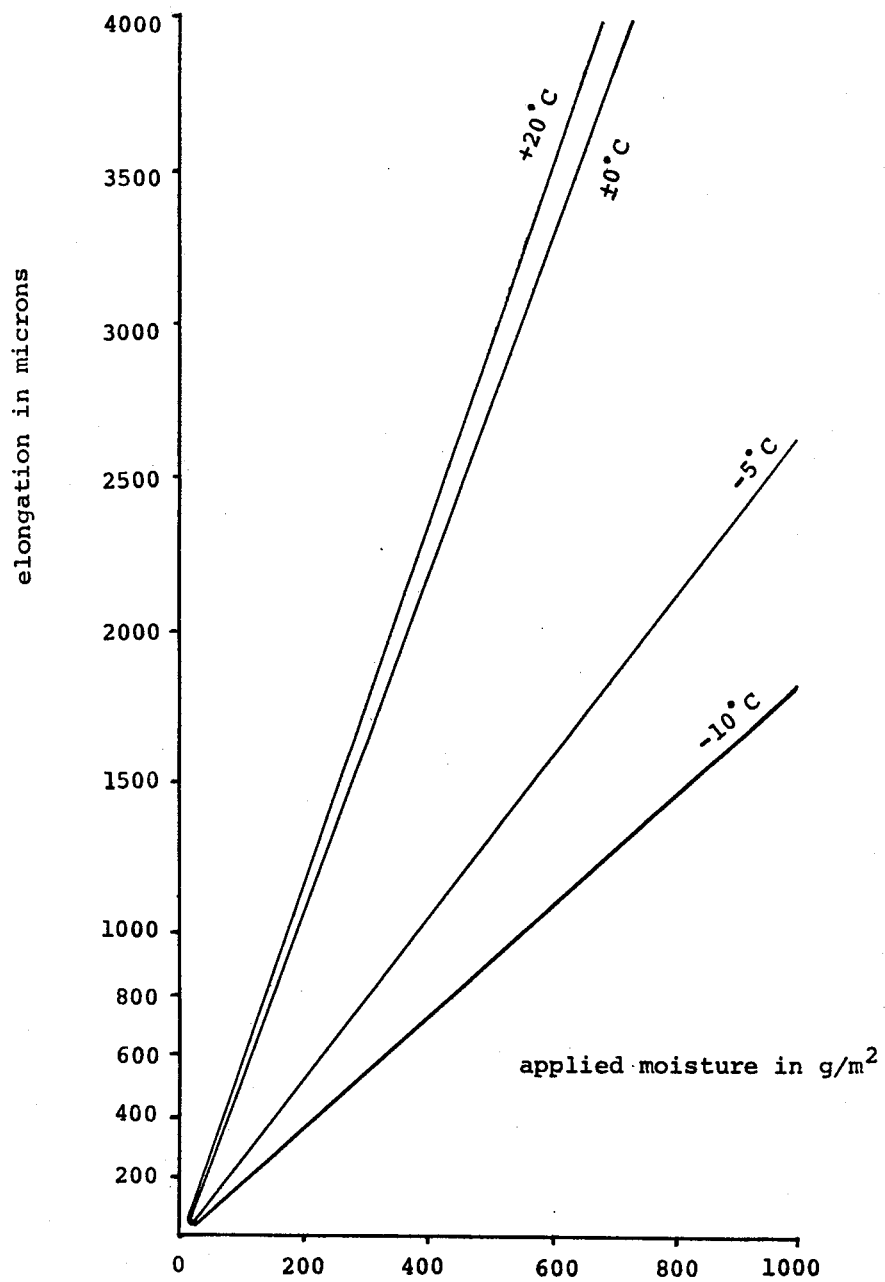

COATING MATERIALS

CROSS REFERENCE TO A RELATED APPLICATION

Applicants claim priority under 35 USC 119 for application P 27 50 903.1 filed Nov. 14, 1977 in the Federal Republic of Germany.

BACKGROUND OF THE INVENTION

The present invention relates to coating materials which are based upon aqueous emulsions and/or dispersions and/or solutions of film forming binders or solutions of film forming binders in organic solvents eventually containing water, possibly also containing pigments, extenders, fillers, softeners, additives and admixtures, and the use of these coating materials for various applications, in particular for construction.

The starting materials of the present invention may be ascertained by reference to the Kirk-Othmer "Encyclopedia of Chemical Technology" Second Edition, Vol. 9 (1966), pp. 220–244 under the section FILM MATERIALS, particularly the cast films of Table 5 on page 226 and page 240 Emulsion, Plastisol and Organosol Forming; Vol. 7 (1965), pp. 676–716 under the section ELASTOMERS, SYNTHETIC; and Vol. 17 (1968) pp. 543–645 under the section RUBBER COMPOUNDING, particularly page 582 where the preparation of rubber crumb is disclosed and pages 592–602 where Latex Compounding is disclosed.

It is industrial practice to prepare coating materials containing organic and/or inorganic pigments and also extenders and/or fillers. It is furthermore conventional practice to put admixtures and additives into the coating materials for the purpose of achieving film formation under the influence of heat or crosslinking, so as to obtain satisfactory coatings fit for use. Depending on the kind of binder, on the concentration of pigment by volume, and on the processing, products are obtained which result in coatings with surfaces ranging from smooth to structured and from soft-plastic to hard-brittle films. Coating materials of this kind can be used as enamels, fillers, caulks, grouts, mortars. However, they cannot accommodate expansion joint cracks or cracks in concrete, masonry or plaster in the field of construction, rather they also crack or tear.

The specific properties of the coating materials can be pronouncedly controlled by the introduction and use in percentage proportions of pigments of various kinds and of previously known fillers or extenders. This applies especially to the behavior of the films under temperature stresses below ordinary temperatures down to deep-freeze values. It is found that the elasticity of the films is adversely affected. While adding organic fiber materials provides a slight improvement in the film properties as regards stretching, it fails to meet the problems in films and coatings which must accommodate cracks when stressed at temperatures below normal to deep-freeze values.

SUMMARY OF THE INVENTION

Having in mind the limitations of the prior art, it is an object of the present invention to provide industrial coating materials offering air-drying or thermally setting hardening coatings superior to conventional coating materials and which offer furthermore clearly noticeable, improved film properties with respect to high stretching and elasticity.

This object is surprisingly achieved by coating materials based upon aqueous emulsions and/or dispersions and/or solutions of film forming binders (where appropriate in organic solvents containing water) possibly containing pigments, extenders, fillers, softeners, admixtures and additives, which is characterized by additionally containing a fine elastomeric powder dispersed through it. Especially advantageous results are obtained when using fine, elastomeric powder consisting of rubber crumb and/or a micronized, fine particle rubber material. Such a rubber crumb is obtained for instance by grinding vulcanized rubber containing fillers as disclosed in Kirk-Othmer, ibid, Vol. 17, page 582.

The coating means is furthermore characterized in that it contains in dispersed form the fine, elastomeric powder, in grain sizes less than 4,000 microns (1–4,000 microns). The preferred range of particle size of the elastomeric powder is 1 to 500 microns. The concentration of pigment by volume based upon the volume of the film forming binders and the fine-particle, rubber-elastic powder is preferably between about 5 and 65%.

In another preferred embodiment, the coating materials contain from 2% by weight to 150% by weight of fine-particle, elastomeric powder, based upon the weight of film forming binder.

BRIEF DESCRIPTION OF THE DRAWING

The FIGURE of the drawing is an X-Y plot of applied moisture in grams per square meter versus elongation in microns for stretching coating materials filled with rubber crumb and with 65% pigment volume concentration showing the results of Example 1.

DESCRIPTION OF THE PREFERRED EMBODIMENTS

Surprisingly, the coating materials of the present invention following deposition on a substrate provide coatings for which the specific properties of the binders are clearly modified and improved over a wide range of temperature down to deep-freeze values. The coatings are highly extensible and are very reversible. It was surprising and unforeseeable that the physical properties of the binders in use should be modified by the introduction of fine-particle, elastomeric powder in such a way that the cured coatings too would assume rubber-elastic properties.

This surprising effect, for instance in the change of thermoplastics in the rubber-elastic range, may be applied in many areas. This represents a significant technical step forward, as now for instance also joints and cracks in facades, inside walls and ceilings can be permanently bridged in old and new construction using a coating. The coating materials of the present invention allow making skid- and wear-proof floors in industrial facilities and in sport places. Again roof coatings and coatings for constructions in the ground, such as humidity barriers, can be prepared. The coating materials of the present invention furthermore are applicable as underground protection and as low frequency acoustic protection, in metal underground construction.

The coating materials are based on aqueous emulsions and/or dispersions and/or solutions of film forming binders or on solutions of film forming binders where appropriate in organic solvents containing water. The term film forming binders includes synthetic resins deposited on a substrate and which after drying or hardening form a cohesive film. Suitable synthetic resins are polymer resins, polycondensate resins and polyaddition resins which may be used singly or mixed together. Examples of suitable polymer resins are homo- and/or copolymerizates from acrylic acid esters and/or methacrylic acid esters, vinylesters of organic acids, styrene, substituted styrenes, vinylacetate, vinylpropionate and also mixtures of these monomers. Furthermore, other copolymerizing compounds may be present, for instance maleic acid and/or fumaric acid as well as their esters, amides, half-amides or half-esters, further amide groups or acrylic compounds containing substituted amide groups, for instance acrylic acid amide or methacrylic acid amide or N-methylolacrylic acid amide or N-methylolmethacrylic acid amide, further N-vinyllactam, N-vinylpyrrolidone, acrylonitrile, methacrylonitrile, acrylic acid, methacrylic acid or doubly unsaturated compounds such as butadiene or isoprene. Again, crosslinking compounds such as divinylbenzol or acrylic acid and/or methacrylic acid esters of divalent or polyvalent alohols, for instance butanedioldiacrylate may participate in the polymerization. Suitable polycondensation resins for instance are polyester resins, alkyd resins and/or polyurethane resins. Resins from the group of epoxy resins together with the pertinent hardening catalysts are used as polyaddition resins.

Even though these resins can be used in the form of aqueous dispersion or in that of solutions in organic solvents, as a rule aqueous emulsions or dispersions are preferred because they contain no organic solvents and therefore offer the advantage of being incombustible and furthermore release no organic solvent into the air during the drying process. The preparation of the aqueous dispersions of the polymerizate resins takes place in known manner following known methods and as a rule as emulsion polymerization. In general, conventional emulsifiers such as pariffin sulfonic acids or adducts of ethylene oxide to fatty alcohols or phenols are used, together with the conventional polymerization initiators—in particular radical-bonding compounds such as ammonium persulfate or potassium persulfate, azodiisobutyric acid nitrile, ditertiary butyl peroxide, or also redox catalysts. The emulsifiers and the polymerization initiators are used in conventional quantities.

The aqueous dispersions so obtained contain the polymerizate particles in finely distributed form and in sizes between 0.01 and 20 microns. The solid content is between 15 and 70% by weight and the pH value is between 2 and 11.

The dispersions furthermore may contain pigment or fillers where appropriate. Suitable among these are for instance titanium dioxide, carbon black, metallic oxides, hydroxides, sulfides, sulfates, silicates, chromates or organic coloring pigments or also metal powders such as of aluminum, bronze and the like. Various fillers and extenders, for instance talc, baryte, kaolin, calcite, quartz, mica, micronized synthetic and natural fibers, diatomaceous earths and others may be included.

As regards admixtures and additives, the polymerizate dispersions additionally may contain special wetting agents of anionic or non-ionic nature, further antifrothing agents or thickeners.

In conformity with the present invention, the coating materials additionally comprise a fine-particle, elastomeric powder dispersed through them. Such fine-particle, elastomeric powders are any natural or synthetic rubber polymers and copolymers, provided they can be ground or are obtained in powder form. Rubber crumb is vulcanized rubber ground using for instance a disk attrition mill or micronized by any other suitable milling means to obtain a fine-particle powders. Fillers may be integrated into the rubber and these fillers improve the tear-and-wear resistance of this rubber. Depending on the conditions of vulcanization, various products are obtained, from soft to hard rubber powder. The manufacture of these materials is known and is not claimed herein. Use is made of the terminally vulcanized products, which merely require further grinding and micronization. The content in filler may amount to 10 to 90% by weight. The best results are obtained from vulcanized rubbers containing about 30% fillers. The ground and/or micronized powder evidences a grain size distribution between 1 and 500 microns. However, the grain size can be varied so that depending on the desired coating thickness and coating structure, various grain distributions are feasible within the limits of 1 and 500 microns. As a rule mixtures of various grain sizes are used so that the film is packed as tightly as possible. Again, it is possible to use rubber materials of the most diverse kinds already containing fillers and being vulcanized and shaped and recovered by comminution for use as elastomeric powders.

As a rule the integration of the elastomeric, fine-particle fillers in the coating materials is carried out by dispersion, while stirring vigorously, into the previously prepared dispersion or emulsion or solution. The coating materials of the present invention are deposited by known methods on metal, concrete, facades, inside walls, outside walls and ceilings in old and new constructions. The materials may be applied by painting, rolling, spraying or troweling. Subsequent drying of the coatings takes place in conventional manner in air, though heat may also be supplied, infrared drying or direct heating being employed depending on the particular substrate. For temperatures between 80° and 150° C., from 60 to 30 minutes are required in general to achieve waterproof as well as highly elastic and hard coatings. The required curing times drop as the hardening temperature rises.

Whereas the elasticity of a pure binder film is clearly degraded by the addition of quartz dust, it was surprisingly found that the films elasticity is so improved by the addition of the fine-particle, rubber-elastic powder as to be several times higher than for the pure, unblended binder film. Following stretching the coatings incorporating the elastomeric fine-particle powders evidence such reversibility that the coating returns to its original size. This property is found neither in the unblended, pure binder film nor in that filled with quartz dust.

The physical properties of the binders used are changed by the introduction of fine-particle, elastomeric powders in such a direction that a thermoplastic material can be turned into an elastomeric one.

This surprising effect of changing from thermoplastic synthetics to the elastomeric range may be utilized in many new applications. Thus it is possible to bridge gaps and cracks in facades, inside walls and ceilings in old and new constructions. Skid and wear-resistant floor surfacings may be made for industrial floors and sports facilities. Again roof coatings and elastic coatings for construction in the ground may be prepared. As regards metal underground construction, the coating materials of the present invention can also be used as sub-grade protection and anti-rumble paste.

It was surprising that stresses and extensions in the sub-grade constructions to be coated could be attenuated and permanently bridged and protected against local humidity by coating materials filled with elastomeric powder. Furthermore such coating materials offer a relative good passage to water vapor compared to (conventional) building material sub-grade constructions. Depending on the amount of applied moisture and thickness of the dry film, the coating may be elongated even at $-10°$ C. for an assumed crack of 0.1 mm by a few thousand percent—without tearing.

SPECIFIC EXAMPLES

The examples below are meant to explain the present invention without thereby restricting it. Percentages and parts are by weight.

EXAMPLE 1

A copolymerizate dispersion with a solid content of 50% and made of 65% by wt of styrene and 35% by wt of ethyl acrylate and with a pH value of 8.0 is prepared by emulsion polymerization. Four portions each of 100 parts by wt are separated from this dispersion and each portion (a), (b), (c) and (d) receives the following:
  (a) 13 parts of rubber crumb
  (b) 23 parts of quartz dust
  (c) 130 parts of rubber crumb, and
  (d) 230 parts of quartz dust,
which are dispersed with a rapid stirrer and evenly distributed.

The rubber crumb contains 30% filler in the form of carbon black. The grain size distribution of the rubber crumb agrees with that of the quartz dust, being
  0–50 microns: 5–10%
  50–100 microns: 10–20%
  100–250 microns: 20–40%
  250–500 microns: 20–40%

The pigment-volume concentration (hereafter PVC) of mixtures (a) and (b) is 16%, that of mixtures (c) and (d) is 65%. That is (a) has 16% volume of rubber crumb and carbon black; (b) has 16% volume of quartz dust; (c) has 65% volume of rubber crumb and carbon black; and (d) has 65% volume of quartz dust.

Films with a dry thickness of 500 microns were made on glass plates from the dispersion alone and from mixtures (a), (b), (c) and (d), and after 24 hours drying in air were removed from the glass plate. The free films were stored for 4 weeks in the standard atmosphere 23/50 per German Industrial Standard DIN 50014. Then the films were tested at $+5°$ C. and at $-5°$ C. for their stretching per German Industrial Standard DIN 51221. The results are listed in the table which follows:

TABLE

|  | PVC | % Elongation at $+5°$ C. | % Elongation at $-5°$ C. |
| --- | --- | --- | --- |
| Styrene Acrylate Dispersion Example 1 | — | 50 | 1.8 |
| Styrene Solution Example 2 | — | 54 | 2.1 |
| Example 1a | 16% | 60 | 3.3 |
| Example 1b | 16% | 6.5 | 0.6 |
| Example 2a | 16% | 65 | 3.5 |
| Example 2b | 16% | 7 | 0.8 |
| Example 1c | 65% | 96 | 5.5 |
| Example 1d | 65% | 0.8 | 0.1 |
| Example 2c | 65% | 98 | 5.7 |
| Example 2d | 65% | 1.0 | 0.15 |

EXAMPLE 2

A rapid stirrer is used to disperse similarly to example 1
  (a) 13 parts of rubber crumb
  (b) 23 parts of quartz dust
  (c) 130 parts of rubber crumb
  (d) 230 parts of quartz dust
into a solution of a copolymerizate of 65% by wt. styrene and 35% by wt. ethylacrylate in a 1:1 benzine-xylol mixture each time of 100 parts and containing 50% solids, uniform distribution thus being obtained. In this case too mixtures (a) and (b) have a PVC of 16% and (c) and (d) of 65%. Dry films with a thickness of 500 microns are prepared on glass plates from the copolymer solution and from mixtures (a), (b), (c) and (d) as described in example 1. Again as in example 1, the films were tested and the results are listed in the above table.

As shown by the above table, the elasticity of the pure binder film is clearly degraded by the addition of quartz dust. On the other hand the elasticity of a film with incorporated rubber crumb is appreciably improved. It was found further that the films with rubber crumb evidence retraction to the original size with elimination of (residual) elongation, while the films filled with quartz dust lack this property.

The figure of the drawing shows a graph of the elongation of a rubber crumb filled dispersion with a PVC of 65% per example 1 at different temperatures and for a gap (crack) width of 0.1 mm as a function of the applied amount of moisture in $g/m^2$.

EXAMPLE 3

A foam troweling substance is obtained in a mixer from
  20 parts of the aqueous dispersion obtained in example 1
  25 parts of rubber crumb
  5 parts of finely ground phenolic resin foam (maximum grain size: 200 microns)
  2 parts of foamed polystyrene (maximum grain size: 0.5 mm)
  48 parts of water,
which was used in its final consistency as a troweling or caulking material for bridging cracks in construction components.

EXAMPLE 4

A coating material is prepared in a mixer from
  30 parts of a 45% aqueous acrylate dispersion consisting of
    50% butylacrylate
    45% methylacrylate
    5% methylmethacrylate
  10 parts of rubber crumb
  20 parts of titanium dioxide rutile
  10 parts of talc/mica 1:1
  5 parts of micronized acrylic fibers
  24 parts of water
which is used as a thick-layer filler paint against reticular and shrinkage cracks of mineral plasters of mortar group 11, being deposited in thicknesses from 600 to 1000 microns.

EXAMPLE 5

A coating material is prepared in a mixer from
  45 parts of the aqueous dispersion obtained in example 1

15 parts rubber crumb
10 parts titanium dioxide rutile
10 parts silicate/mica/talc 1:1:1
20 parts water which is suitable as concrete bonding for bridging cracks on plaster and mortar surfaces in construction.

EXAMPLE 6

A coating material is prepared in a mixer from
40 parts of the aqueous dispersion obtained in example 1
20 parts rubber crumb
15 parts titanium dioxide rutile
25 parts water which is deposited at the rate of 1,500 g/m² on finish backings by means of a painting roller and which after air drying evidences structure.

EXAMPLE 7

A caulking material is obtained in a mixer from
50 parts of an acrylate dispersion consisting of
 70% butylacrylate
 5% acrylic acid
 25% ethylhexylacrylate
30 parts rubber crumb
1 part iron oxide red
1 part highly disperse silicic acid
2 parts perlon fibers 1-2 mm long
16 parts water and is suitable for caulking joints in construction.

EXAMPLE 8

A coating material is obtained in a mixer from
50 parts of a 50% aqueous butadiene-styrene (70:30) dispersion
40 parts rubber crumb
2 parts chromoxide green
8 parts water and is suitable as surfacer for sports places. Application is by means of smoothing trowel on concrete and finished floors in thicknesses of 2-4 mm.

EXAMPLE 9

A coating means is prepared in a mixer from
52 parts of an aqueous polyvinylacetate dispersion consisting of
 40% polyvinylacetate and
 10% trichloroethylphosphate as softener,
30 parts rubber crumb
5 parts titanium dioxide rutile
5 parts mica
5 parts antimony trioxide
5 parts liquid chloroparaffine which is deposited on a blacktop roof at a rate of 1,000-1,500 g/m² by means of a sprayer. Following drying, a weatherproof coating is obtained, which is ignition-resistant and reflects heat irradiation.

EXAMPLE 10

A coating is prepared in a mixer from
60 parts of the resin solution obtained in example 2,
15 parts rubber crumb
20 parts cork dust
5 parts asbestos fibers which is deposited on the underside of automobile bodies as underbody protection by means of sprayers in a thickness of 203 mm. The dried layer attenuates stone impacts and furthermore evidences good sound-attenuating effects at low frequencies.

We claim:

1. Process comprising preparing stretchable coatings capable of reverting to their initial size for the permanent bridging of joints and cracks in base materials selected from the group consisting of facades, walls and ceilings of constructions, industrial floors and constructions at subgrade level from aqueous dispersions by dispersing therein film forming binders selected from the group consisting of polymer resins, polycondensate resins or polyaddition resins and an elastomeric powder material, said film forming binders having a particle size of between 0.01 and 20 microns, the solid content of the aqueous dispersion of said film forming binders being between 15 and 70% by weight, said elastomeric powder having a grain size distribution between 1 and 500 microns, said elastomeric powder being contained in said aqueous dispersion from 2% by weight to 150% by weight and the pH value of said aqueous dispersions being between 2 and 11, coating said aqueous dispersions on said base materials and drying said aqueous dispersions to said stretchable coatings.

2. The process of claim 1, wherein said elastomeric powder is rubber crumb or micronized, fine-particle rubber material.

3. The process of claim 1, wherein said elastomeric powder is rubber crumb obtained by grinding vulcanized rubber containing fillers.

4. The process of claim 1, wherein said elastomeric powder volume based on the total volume of said film forming binders and said elastomeric powder is between about 5 and 65%.

5. The process of claim 1, further comprising additives selected from the group consisting of pigments, extenders, fillers, softeners, admixtures and additives.

6. Cracks and joints bridged in facades, walls and ceilings with said stretchable coatings prepared by the process of claim 1.

7. Skid and wear proof floor surfacings in industrial plants and sports facilities from said stretchable coatings prepared by the process of claim 1.

8. Roof coverings from said stretchable coatings prepared by the process of claim 1.

9. Acoustic low frequency insulation for metal subgrade construction from said stretchable coatings prepared by the process of claim 1.

* * * * *